United States Patent [19]

Beynon

[11] 3,928,950
[45] Dec. 30, 1975

[54] STRUCTURAL MEMBER WITH END CONNECTOR

[75] Inventor: John O. Beynon, Waterloo, Canada

[73] Assignee: Preston Metal and Roofing Products Limited, Cambridge, Canada

[22] Filed: May 17, 1974

[21] Appl. No.: 470,721

[52] U.S. Cl. ............... 52/726; 52/758 D; 403/393
[51] Int. Cl.² ............................................. E04C 3/04
[58] Field of Search ............. 52/726, 758 A, 758 D; 403/393

[56] References Cited
UNITED STATES PATENTS

| | | | |
|---|---|---|---|
| 1,028,829 | 6/1912 | Reuterdahl | 52/758 D |
| 2,406,895 | 9/1946 | Olson | 403/393 |
| 2,528,910 | 11/1950 | Poe | 52/758 D |
| 3,221,466 | 12/1965 | Downing | 52/726 |
| 3,374,596 | 3/1968 | O'Brien | 52/726 |
| 3,482,289 | 12/1969 | Stradella | 403/393 |
| 3,606,417 | 9/1971 | Rousey | 52/758 |
| 3,722,167 | 3/1973 | Rousey | 52/726 |

*Primary Examiner*—Ernest R. Purser
*Assistant Examiner*—Henry Raduazo

[57] ABSTRACT

A structural member has a planar web portion provided at least at one end with an integral connector means to enable the member to be connected in end to end relation with a corresponding member having a corresponding connector means. The connector means comprises a tongue receiving socket portion extending longitudinally inwardly from the end of the member and formed by displacing a portion of the web out of its plane to provide a socket bottom offset to one side of the plane of the web. A retainer strap is connected at its ends to the web and is struck from the socket bottom transversely of the socket intermediate the ends thereof and offset to the other side of the plane of the web to transversely bridge the socket in spaced relation to the bottom thereof. A tongue portion of a configuration to be received in a socket portion corresponding to the aforesaid socket portion extends longitudinally outwardly from the end of the member as an extension of the socket bottom. The tongue is formed to present intermediate the ends thereof a locking barb projecting therefrom on the side thereof away from the plane of the web. The barb has a strap engaging locking shoulder facing away from the end of the tongue.

10 Claims, 5 Drawing Figures

U.S. Patent    Dec. 30, 1975    3,928,950
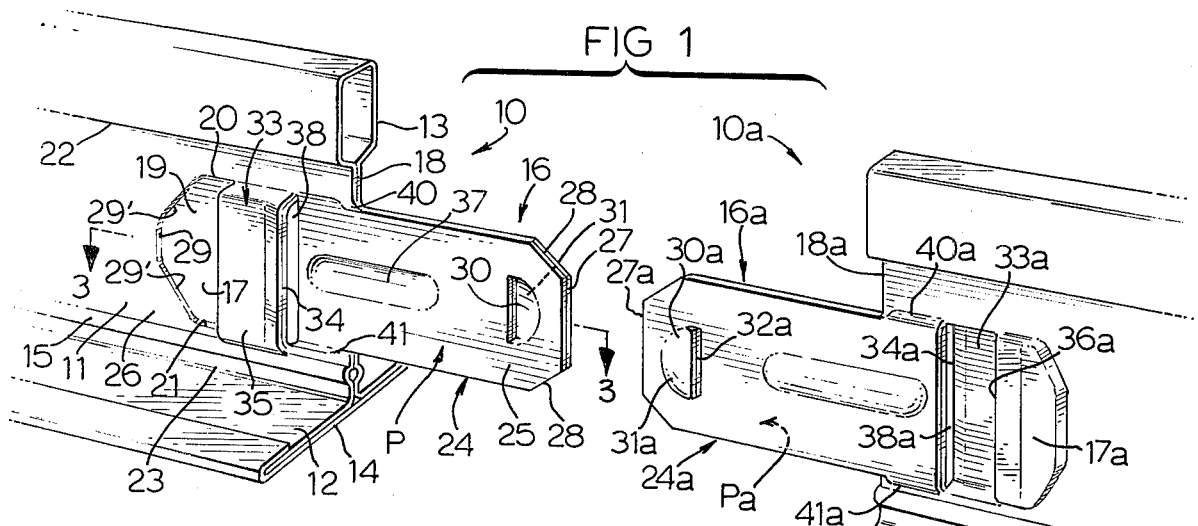
FIG. 1
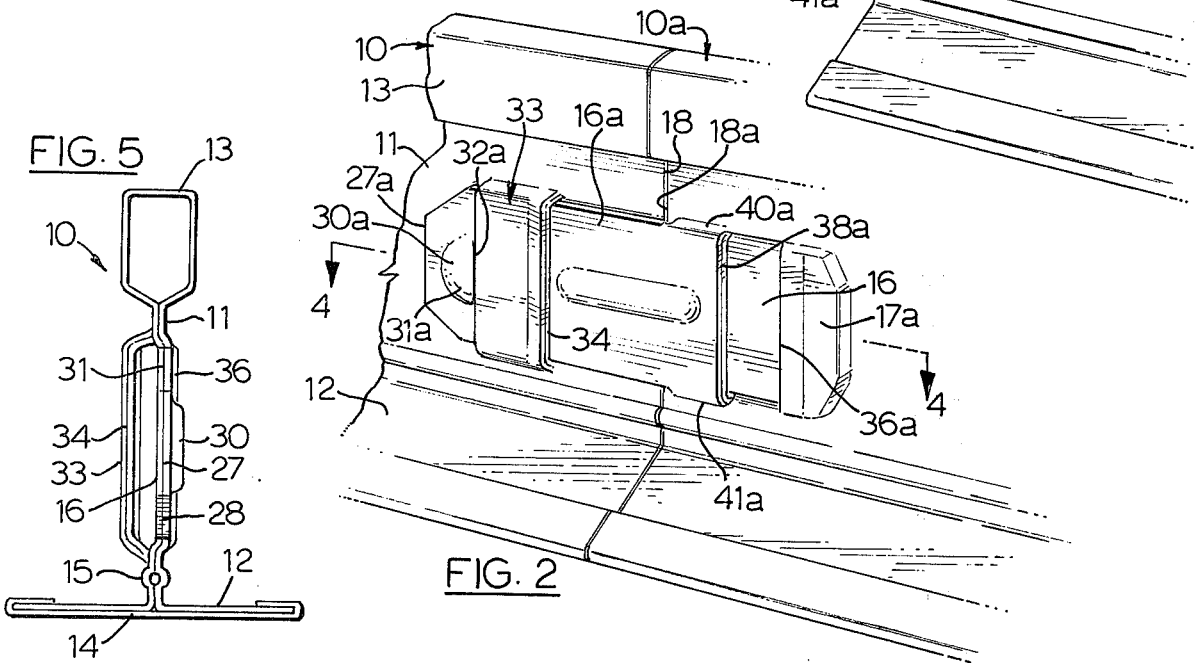
FIG. 5
FIG. 2
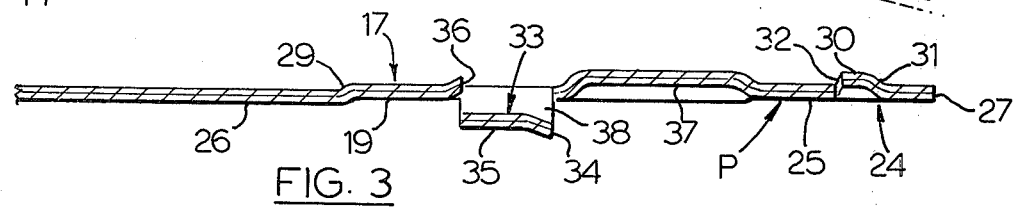
FIG. 3
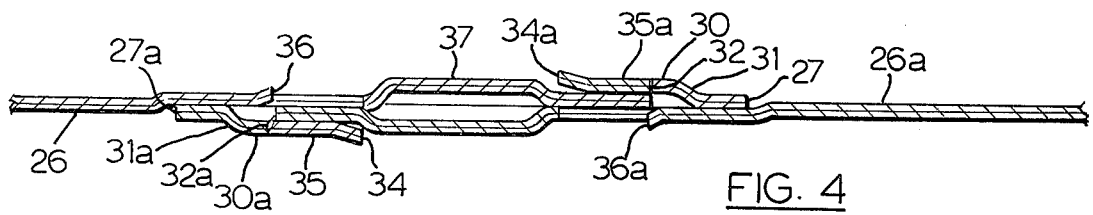
FIG. 4

STRUCTURAL MEMBER WITH END CONNECTOR

FIELD OF THE INVENTION

This invention relates to improvements in beams of the type used, for example, in suspended ceiling systems or the like and more particularly to beams having improved end connectors for connecting the beams in end-to-end relation.

BACKGROUND OF THE INVENTION

The means for connecting the main beams, for example, of a suspended ceiling grid system in end-to-end relation require certain basic characteristics in order to be useful. In particular these main beams which are normally of inverted T-section and which support the cross members must be able to be connected easily and quickly in end-to-end relation and since they must bear a certain amount of weight and are subject to rough handling during the insertion of the cross members, the end-to-end connection must be completely secure against accidental uncoupling as otherwise the erection of the ceiling grid becomes almost impossible and the connection must be perfectly rigid and hold the beams together in exact longitudinal alignment, not only for the aesthetic appearance of the ceiling but also for proper placement of the ceiling tiles. At the same time, it may become necessary to replace a beam and it is therefor important to be able to unlock the end connections without having to destroy the beam. The means for connecting the beams also must be easy and economical to manufacture and must be capable of being formed from the planar material of the beam web in order to keep the tooling costs to a minimum.

Present means for connecting the beams all have one or more problems. For example, some connections require separate parts which is highly unsatisfactory. Again other connecting means require some deflection or distortion to obtain a satisfactory interlock. While such deflection can be tolerated when light gauge metal can be used, the connections are inoperative where heavy guage metal is required. Moreover, there are usually protuberances forming part of the locking system which interfere with the mating of the interlocking parts. Again, the need for deflection or distortion of the interlocking parts also tends to prevent the obtaining of the highly desired precise longitudinal alignment of the main T's or beams. Other arrangements do not provide the necessary security of interlock, or, if they do, require destruction of the beams when separation is required. Still again, other arrangements are complicated and expensive as well as being unreliable.

It is the object of the present invention to provide a means for connecting, for example, the main T's or beams used, for example, in a ceiling grid, in a manner in which the mating parts can be easily and quickly brought together in a perfectly secure interlock joining the beams in precise and rigid longitudinal alignment without requiring deflection or distortion of the connecting means when in interlocked relation. Again, it is an object of the invention to provide the beams with mating end connectors which do not carry any interfering protuberances but can be coupled by sliding broad flat planar surfaces past each other in the locking action.

A further object of the invention is to provide positive guide means to properly relatively locate and guide the connector members as they are slid one past the other to the locking position.

Still again, it is an object of the invention to achieve locking by the use of integral resilient elements formed out from the connector members in a manner to provide a completely secure and positive snap interlock regardless of the gauge of metal, and at the same time to provide a means whereby if required, the beams can be separated without damage.

Still further, it is an object to provide connector means as aforesaid which are integral with the beams and are economical to manufacture.

SUMMARY OF THE INVENTION

According to the invention, the structural beam has a planar web portion provided at least at one end with an integral connector means comprising a tongue receiving socket portion extending longitudinally inwardly from the end of the beam and formed by displacing a portion of the web out of its plane to provide a socket bottom offset to one side of the plane of the web, a retainer strap connected at its ends to the web struck from the socket bottom transversely of the socket intermediate the ends thereof and offset to the other side of the plane of the web to transversely bridge the socket in spaced relation to the socket bottom and a tongue portion of a configuration to be received in a socket portion corresponding to the aforesaid socket portion, the tongue extending longitudinally outwardly from the end of the beam as an extension of the socket bottom and offset to the said one side of the plane of the web, the tongue being formed to present intermediate the ends thereof a locking barb or latch element projecting therefrom on the side thereof away from the plane of the web, the barb having a strap engaging locking shoulder facing away from the end of the tongue.

Preferably the socket bottom is a generally flat planar surface parallel to the plane of the web and offset from the plane of the web by substantially half the thickness of the web. The tongue is generally a flat planar surface co-planar with the socket bottom and the strap is parallel to the socket bottom and spaced therefrom a distance substantially equal to the thickness of the web.

Also preferably the strap and socket bottom portion from which the strap is struck are provided with tongue guiding cam surfaces.

Also preferably the tongue and socket bottom are ribbed for strength with the rib arrangment projecting from the side thereof away from the plane of the web.

For beams other than those to be used as the end of the span, it will be understood that the connector means at opposite ends of each beam will be reversed with respect to the plane of the web. It will be further understood that when the beams are arranged in end-to-end relation, the connector means of adjoining ends of beams will be reversed with respect to the plane of the beam so that mating tongue and sockets of opposite hand may be brought together without any protuberances interfering with the sliding of the one planar connector face against the other planar connector face to introduce the tongue portions into their respective receiving socket portions of the connectors with the tongues entering beneath the retaining straps until the locking barbs or latches snap out behind the straps with the locking shoulders engaged therewith.

BRIEF DESCRIPTION OF THE DRAWINGS

FIG. 1 is a broken away perspective view of a pair of main beams or T's provided with connecting means in accordance with the invention and illustrating the two beams in a position about to be interlocked.

FIG. 2 is a perspective view of the end portions of the beams after they have been interlocked.

FIG. 3 is a horizontal sectional view taken on the line 3—3 of FIG. 1.

FIG. 4 is a horizontal sectional view taken on the line 4—4 of FIG. 2.

FIG. 5 is an end view of one of the beams.

DETAILED DESCRIPTION OF THE DRAWINGS

With reference particularly to FIG. 1, it will be seen that a typical beam with which the invention is concerned and designated at 10 is in the form of an inverted T formed of sheet metal and having a vertical web portion 11, outwardly turned flange portions 12 at the bottom of the web, and a reinforcing rib 13 running along the top edge of the beam. The beam is preferably formed of sheet metal and has the vertical web portion 11 formed by a double thickness of the metal with the metal being turned outwardly at the bottom at each side to form the flange portions 12 and being rolled into shape to form the rib 13. A bottom cap 14 is applied over the flanges 12 to add increased strength to the bottom flange structure and provide a finished appearance and preferably the metal of the web 13 is rolled to provide a reinforcing bead 15 immediately above the flange arrangement 12.

the connector means for joining the two beams 10 and 10a together are generally designated at 16 and 16a, respectively, and it will be understood that the one connector arrangment will be the reverse of the other with respect to the plane of the web 11, with like parts of the connector on beam 10a being identified by the letter a.

The connector generally designated at 16 is formed from the web material and is comprised by a recess or socket portion 17 extending inwardly from the end 18 of the beam and formed by displacing the metal of the web 11 laterally the thickness of the metal or one half the thickness of the web which at this point comprises two thicknesses of metal. The socket 17 has in effect a flat planar bottom wall 19 parallel to the near face 26 of the web but offset to the rear thereof half the thickness of the web. The socket or recess 17 also has a height which is a substantial portion of the height of the web 11 and the top and bottom walls of the socket 20 and 21 respectively are parallel to the top and bottom edges 22 and 23 respectively of the web 11. The end wall 29 of the socket is preferably angled at the corners as indicated at 29'.

The material of the web 11 is extended out forwardly of the front edge 18 of the beam proper to form a resiliently deflectable cantilever tongue portion 24 of a configuration corresponding to the socket 17 and which as viewed in FIG. 1, has a near face 25 which is co-planar with the adjoining socket bottom wall 19, and like the socket wall 19 is parallel to the near face 26 of the web 11 but displaced rearwardly from this plane one half the thickness of the web. The forward or leading edge 27 of the tongue has the corners bevelled as at 28 to correspond to the socket bevelled corners 29'. It will be understood that the height of the tongue 24 will be slightly less than the height of the socket 17 so that the tongues 24a and 24 will be readily received in the sockets 17 and 17a, respectively. To ensure precise vertical alignment of the beams 10 and 10a, the mouths of the sockets 17 and 17a are necked in to exactly receive their respective tongues by the provision of the inwardly directed lands 40, 41 and 40a and 41a, respectively.

Adjacent the free end the tongue 24 is formed to provide a resilient or spring locking barb or latch 30 formed by cutting from the material of the tongue which material is displaced out of the plane of the tongue away from the near faces 25 and 26 of the tongue and web respectively, so that it does not interrupt or project into the flat planar expanse P provided by the tongue and socket surfaces 25 and 19. It will be understood that the amount of material cut out in forming the barb 30 will depend upon the gauge of the metal from which the beam is formed, so that the barb connecting web material designated at 31 together with the resiliency of the free end of the tongue 24 will provide the requisite spring control to snap the clip outwardly to the position illustrated in FIG. 4 while allowing it to be displaced inwardly by co-action of the parts during the locking action or by force during the unlocking action, as hereinafter more particularly described. In this connection, it will be appreciated that the locking barb 30 presents its locking shoulder 32 facing away from the forward edge 27 of the tongue and the connecting web 31 provides a sloping cam surface to facilitate displacement of the barb in the locking action.

Inwardly of the front edge 18 of the beam 10 a transverse portion of the metal of the socket bottom 19 is struck out, and displaced laterally of the plane of the web in a direction opposite to the displacement of the socket 17 and tongue 24 to provide a strap 33 connected at its ends to the web and overlying the socket bottom 19 in parallel relation thereto and spaced therefrom a distance approximately equal to the thickness of the web so that a mating tongue 24a may be sleeved therebeneath. It will be appreciated that this strap 33 will also exhibit a measure of resiliency to assist in the tongue barb 31 passing therebeneath.

The leading edge 34 of the strap 33 is turned outwardly to form an obtuse angle therewith to act as a tongue guide and cam in the locking action as hereinafter more fully explained. Similarly, the metal of the socket bottom 19 at the edge of the slot 38, created by the removal of the metal to form the strap 33, remote from the front edge 18 of the beam is turned laterally outwardly from the near face of the web 25 as indicated at 36 to also provide a guiding and camming action facilitating the locking function.

To stiffen the connecting means rearwardly of and spaced from the locking barb 30, there is provided a stiffening rib 37 which is displaced laterally away from the near face 25 of the web and extends throughout a substantial length of the tongue 24 and into the socket bottom 19.

FIG. 1 illustrates the beams 10 and 10a in position ready to be interlocked and it will be appreciated that the beam 10 provides as its connecting means the tongue 24, the socket 17 and the retaining strap 33 with the tongue and socket bottom presenting a flat co-planar surface P which carries no protuberances of any kind projecting toward the near face of the web 26. That is, the locking barb or latch 30 and the reinforcing rib 37 extend away from what may be termed the flat co-acting or mating surface P of the connector 16.

Similarly, the connector 16a of beam 10a has its flat co-acting or mating surface Pa uninterrupted by any protuberances but it will be understood that this mating surface Pa will be the surface on the remote side of the tongue 24a as seen in FIG. 1 because of the reversal of the mating connectors 16 and 16a, with respect to the plane of the web.

As the beams are advanced from the position of FIG. 1 to the position of FIG. 2, the lack of any protuberances projecting from the co-operating or co-acting surfaces P and Pa facilitates the sliding of the one tongue face-to-face over the other tongue until the respective tongue ends 27 and 27a are entered beneath the retaining straps 33a and 33 as guided by the leading edges 34a and 34, respectively. As the tongues 24 and 24a are pushed through their respective retaining straps 33a and 33, they will be guided by the guide surfaces 36a and 36, respectively, to prevent the tongues being deflected through the slots or openings 38a and 38 left by the formation of the straps.

In addition to assisting in the guiding of the tongues into proper interlocking position, the surfaces 34 and 34a will also act on the sloping barb walls 31a and 31, respectively, to deflect or cam the locking barbs or latches inwardly to allow them to pass beneath the resilient straps while the leading edges of the tongues are guided and cammed by the surfaces 36a and 36 into the inner ends of the sockets until the barbs have cleared the trailing edges of the straps, at which point they are free to snap outwardly and the straps are free to return inwardly to the locked position illustrated in FIG. 4 to positively and securely lock the beams in rigid interlocked relation.

It will be understood that since the displacement of the tongue and socket portions is only half the thickness of the webs of the beams, that is, one thickness of material, the beams when interlocked, are precisely and accurately longitudinally aligned. In addition, because of the accurate socket throat formations provided by the lands 40, 41, 40a and 41a, the beams are also precisely and accurately vertically aligned. Moreover, in the interlocked position, the tongues lie in the planes in which they normally occupy, and the beams may be disconnected by pressing in the spring barbs 30 and 30a rearwardly of the straps 33 and 33a and by outwardly deflecting the straps 33 and 33a to clear the locking shoulders 32 and 32a from the rear edges of the straps 33a and 33, respectively.

In addition to the effectiveness of the interlock, it will be understood that the simple structure involved which is all integral with the material making up the beam provides a beam which is economical to manufacture, has no loose parts which might become lost and which complicate interlock, and interlocking may be effected with a minimum of difficulty to provide a perfectly rigid interlock without sacrificing the ability to separate the beams without destruction thereof, if required.

It will also be understood that normally unless it is to form an end beam, beam 10 will have a connector corresponding to connector 16a at the end opposite to connector 16 and beam 10a will have a connector corresponding to connector 16 at the end opposite to connector 16a so that a series of beams can be joined end to end over an extended span.

While the preferred embodiment of the invention has been described in detail with respect to a beam of T-section, it will be understood that the invention is obviously applicable to any beam or structural member having a planar web portion and adapted to be connected in end-to-end relation. It will also be understood that variations and modifications may be made by those skilled in the art, without departing from the spirit of the invention or scope of the appended claims.

I claim:

1. A structural member having a planar web portion provided at least at one end with an integral connector means to enable the member to be connected in end to end relation with a corresponding member having a corresponding connector means, said connector means comprising a tongue receiving socket portion extending longitudinally inwardly from the end of the member and formed by displacing a portion of the web out of its plane to provide a socket bottom offset to one side of the plane of the web, a continuous resilient retainer strap connected at its ends to said web struck from said socket bottom transversely of said socket intermediate the ends thereof and offset to the other side of the plane of the web to transversely bridge said socket in spaced relation to the bottom thereof, the portion of the socket bottom from which said strap is struck defining a slot in the socket bottom extending transversely thereacross, and a resilient cantilever tongue portion of a configuration to be received in a socket portion corresponding to the aforesaid socket portion, said tongue extending longitudinally outwardly from the end of the member as an extension of and coplanar with said socket bottom, said tongue being formed to present intermediate the ends thereof a locking barb projecting therefrom on the side thereof away from the plane of the web, said barb having a strap engaging locking shoulder facing away from the end of the tongue, said strap having its leading edge facing towards said tongue portion flared outwardly away from the socket bottom to present a flared entrance to facilitate insertion of the tongue of a corresponding member beneath said strap, and the bottom socket portion forming the edge of said slot nearest the inner end of the socket being flared out away from the plane of the socket bottom and the plane of the web of the member and opposite to the flare of said strap leading edge to provide a cam and guide surface to cam and guide the leading portion of the tongue of a corresponding member being forced under said strap into the inner end of the socket, the arrangement being such that when the barbs of opposing corresponding members being forced into interlocking relation have cleared the inner edges of the straps of the opposing members they snap outwardly while the straps recover inwardly to locate the locking shoulders in locking position behind the inner strap edges.

2. A member as claimed in claim 1 in which said web portion is provided with said connector means at both ends, with the connector means at one end being displaced on the opposite side of the plane of the web from the connector means at the other end.

3. A member as claimed in claim 1 in which the bottom wall of said socket and said tongue are provided with a reinforcing rib projecting away from the plane of the web.

4. A member as claimed in claim 1 in which said barb is connected to said tongue by a camming surface sloping from said shoulder to the plane of the tongue in a direction towards the free end thereof.

5. a structural beam of inverted T-section having a central upright planar web portion, a transverse bottom flange extending on opposite sides of said web portion and a rolled reinforcing top rib, said web portion being provided at least at one end with an integral connector means to enable the beam to be connected in end to end relation with a corresponding beam having a corresponding connector means, said connector means comprising a tongue receiving socket portion extending longitudinally inwardly from the end of the beam and formed by displacing a portion of the web out of its plane to provide a socket bottom offset to one side of the plane of the web, a continuous resilient retainer strap connected at its ends to said web struck from said socket bottom transversely of said socket intermediate the ends thereof and offset to the other side of the plane of the web to transversely bridge said socket in spaced relation to the bottom thereof, the portion of the socket bottom from which said strap is struck defining a slot in the socket bottom extending transversely thereacross, and a resilient cantilever tongue portion of a configuration to be received in a socket portion corresponding to the aforesaid socket portion, said tongue extending longitudinally outwardly from the end of the beam as an extension of and coplanar with said socket bottom, said tongue being formed to present intermediate the ends thereof a locking barb projecting thereform on the said thereof away from the plane of the web, said barb having a strap engaging locking shoulder facing away from the end of the tongue, said strap having its leading edge facing towards said tongue portion flared outwardly away from the socket bottom to present a flared entrance to facilitate insertion of the tongue of a corresponding member beneath said strap, and the bottom socket portion forming the edge of said slot nearest the inner end of the socket being flared out away from the plane of the socket bottom and the plane of the web of the member and opposite to the flare of said strap leading edge to provide a cam and guide surface to cam and guide the leading portion of the tongue of a corresponding member being forced under said strap into the inner end of the socket, the arrangement being such that when the barbs of opposing corresponding members being forced into interlocking relation have cleared the inner edges of the straps of the opposing members they snap outwardly while the straps recover inwardly to locate the locking shoulders in locking position behind the inner strap edges.

6. A beam as claimed in claim 5 in which said web portion is provided with said connector means at both ends, with the connector means at one end being displaced on the opposite side of the plane of the web from the connector means at the other end.

7. A beam as claimed in claim 5 in which the bottom wall of said socket and said tongue are provided with a reinforcing rib projecting away from the plane of the web.

8. A beam as claimed in claim 5 in which said barb is connected to said tongue by a camming surface sloping from said shoulder to the plane of the tongue in a direction towards the free end thereof.

9. A beam as claimed in claim 5 in which said socket and tongue are offset to one side of the plane of said web by substantially one half the thickness of said web and said strap is disposed to lie parallel to said socket bottom and spaced therefrom substantially the thickness of said web.

10. A beam as claimed in claim 5 in which said socket is provided with a necked throat at the entrance thereto to precisely fit a corresponding tongue to provide accurate beam vertical alignment on connection.

* * * * *